Feb. 13, 1934.   A. F. SCHRAMM, JR   1,946,886
ELECTRIC HEATING UNIT
Original Filed March 13, 1930   3 Sheets-Sheet 1
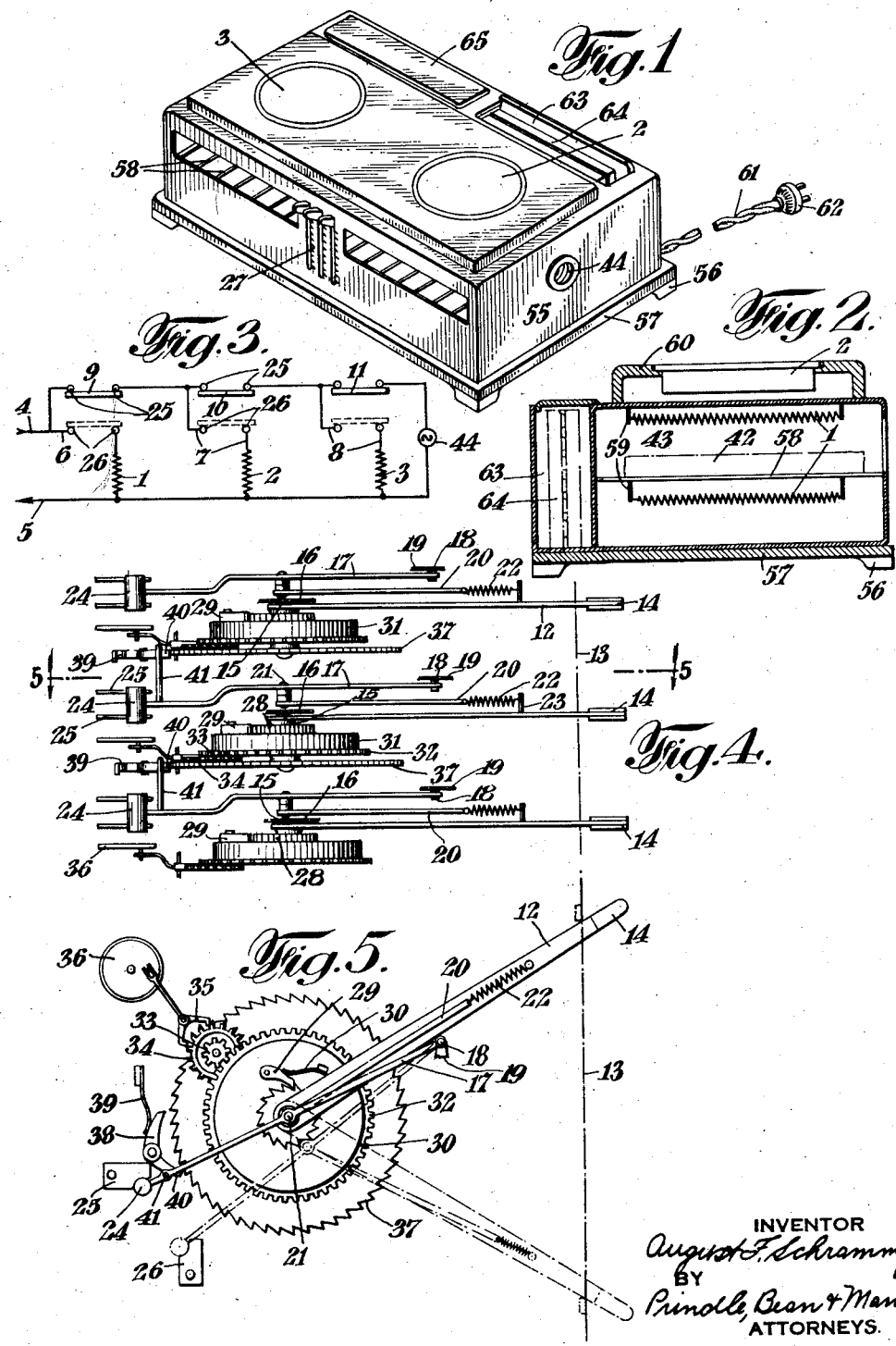

Feb. 13, 1934.  A. F. SCHRAMM, JR  1,946,886
ELECTRIC HEATING UNIT
Original Filed March 13, 1930  3 Sheets-Sheet 2

Feb. 13, 1934.   A. F. SCHRAMM, JR   1,946,886
ELECTRIC HEATING UNIT
Original Filed March 13, 1930   3 Sheets-Sheet 3
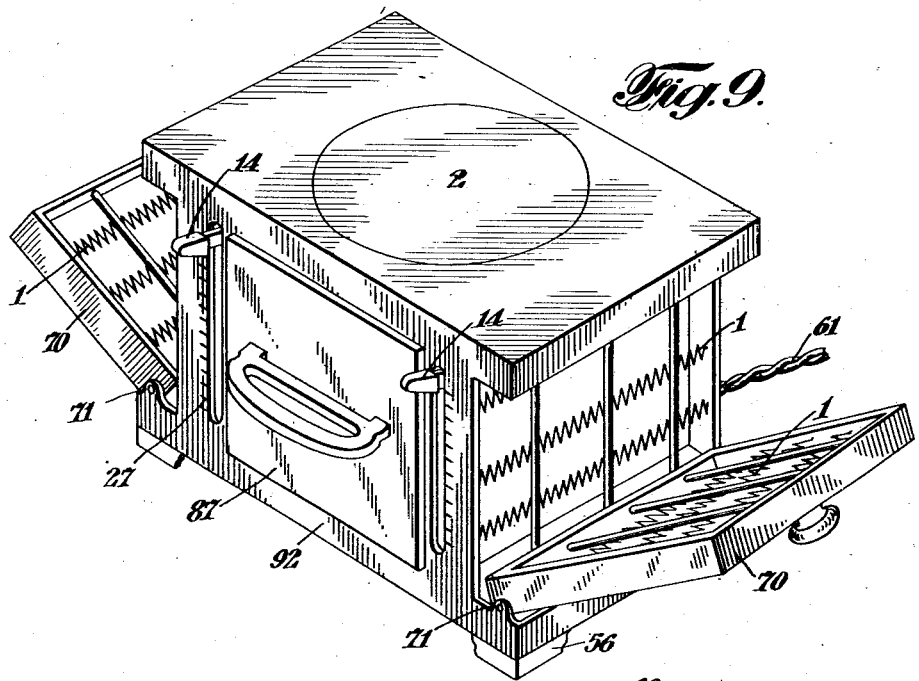
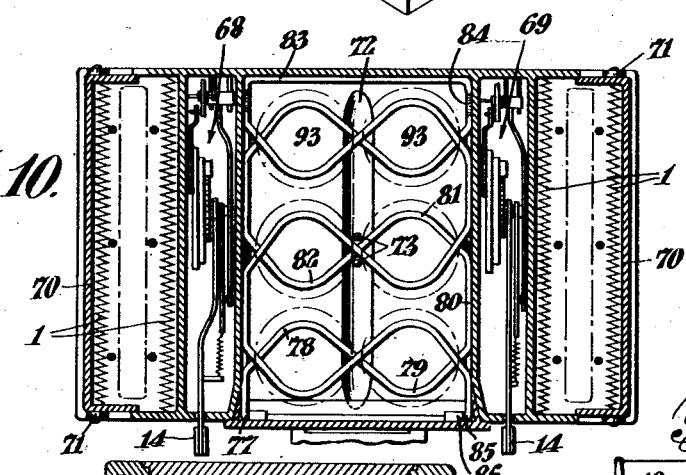
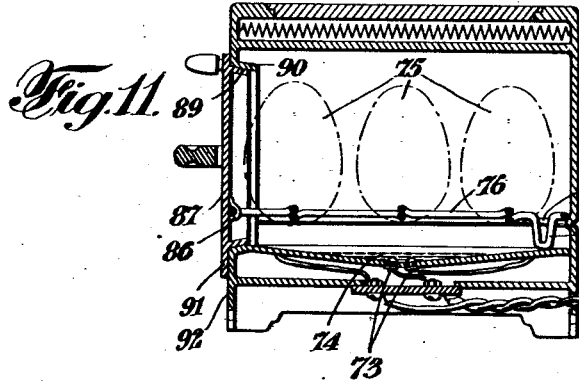
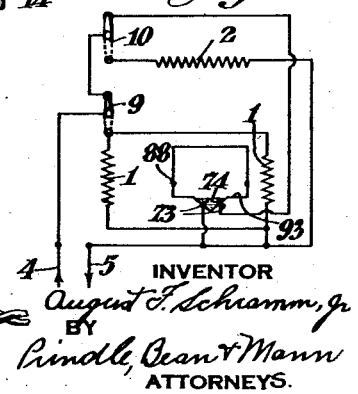
INVENTOR
August F. Schramm, Jr.
BY
Pindle, Bean & Mann
ATTORNEYS.

Patented Feb. 13, 1934

1,946,886

UNITED STATES PATENT OFFICE

1,946,886

ELECTRIC HEATING UNIT

August F. Schramm, Jr., New York, N. Y.

Application March 13, 1930, Serial No. 435,396
Renewed July 19, 1932

20 Claims. (Cl. 219—20)

This invention relates to an electric heating unit, or more particularly, to an electric cooking unit which comprises various cookers, such as hot plates, toasters and an oven.

Many persons who are living in small apartments desire a small electric cooker, or stove, on which a complete hot breakfast or lunch can be cooked with a minimum amount of time and attention given to the cooking of the meal; for instance, a person may desire a breakfast of eggs with coffee and toast. In the usual electric cookers of the type adapted to cook several articles of food, the food must be watched while it is being cooked, and this requires a relatively large amount of attention. Also, the usual stoves draw a relatively large wattage and cannot be connected to the usual electric-light circuits, which quite frequently are not supposed to carry more than from 600 to 1000 watts, which is less power than the usual electric stove will consume when a medium size breakfast is to be cooked.

The electric heater or stove which forms the subject matter of the present invention is intended to be connected to the usual house lighting circuit, and the stove circuit is so arranged that a relatively small amount of power will be drawn from the house circuit at any one time so that the house circuit will not be overloaded, and a steady load rather than a peak load will be drawn, and the heating elements of the stove are automatically connected and disconnected from the circuit so that a number of different articles may be cooked with a minimum amount of attention. In the preferred form of the invention only one heating element at a time is connected to the house circuit and the elements are automatically connected and disconnected after predetermined intervals of time so that each article of food which is cooked by each heating element is cooked for only a predetermined length of time. With this device, eggs, coffee and bread for toasting may be placed on the stove and a timing mechanism set so that the heating element which toasts the bread will be energized for a certain period of time sufficient to cook the toast; and the toasting element will be disconnected from the line and the heating element which heats the coffee will be automatically connected into the line for a certain period of time, after which it will be disconnected and the heating element which cooks the eggs will be connected into the circuit for a predetermined length of time, after which it also is disconnected. It is, therefore, possible for a person to put the eggs, coffee and bread for toasting on the stove, then set the timing mechanism and pay no more attention to the cooking of the meal. The timing mechanism will operate to toast the bread for a certain predetermined time, then heat the coffee, and then cook the eggs, and the complete meal will be cooked with no attention other than putting the articles of food on the stove and setting the timing mechanism and, also, no more than the maximum wattage of any of the heating elements will be drawn from the house circuit at any time so that there will be no danger of overloading the circuit.

Other objects and features of the invention will more fully appear in the following description and claims, taken in conjunction with the accompanying drawings which, however, are intended merely to illustrate the invention and in no way limit it to the embodiment shown and described.

The drawings illustrate in perspective, section and detail, a preferred form of the construction adapted for use in an electric heating unit, such as is described above, and embody the broad principles of the invention.

In the drawings:

Fig. 1 is an elevation of an electric heating unit having three heating elements, namely, a toaster and two hot plates;

Fig. 2 is a section on line 2—2 of Fig. 1;

Fig. 3 is a diagrammatic illustration of the circuit, switches, etc., of the heating unit shown in Fig. 1;

Fig. 4 is a bottom diagrammatic view of a selected form of timing mechanism to be used with the heating unit shown in Fig. 1;

Fig. 5 is a view on line 5—5 of Fig. 5, looking in the direction of the arrows;

Fig. 9 is a perspective of a form of electric heating unit having only a single hot plate but being provided with toasting compartments and a compartment especially adapted for steaming food;

Fig. 10 is a horizontal section through the unit shown in Fig. 9;

Fig. 11 is a vertical section through the unit shown in Fig. 9; and

Fig. 12 is a diagram of the circuit used in the heating unit shown in Fig. 9.

Figure 6:
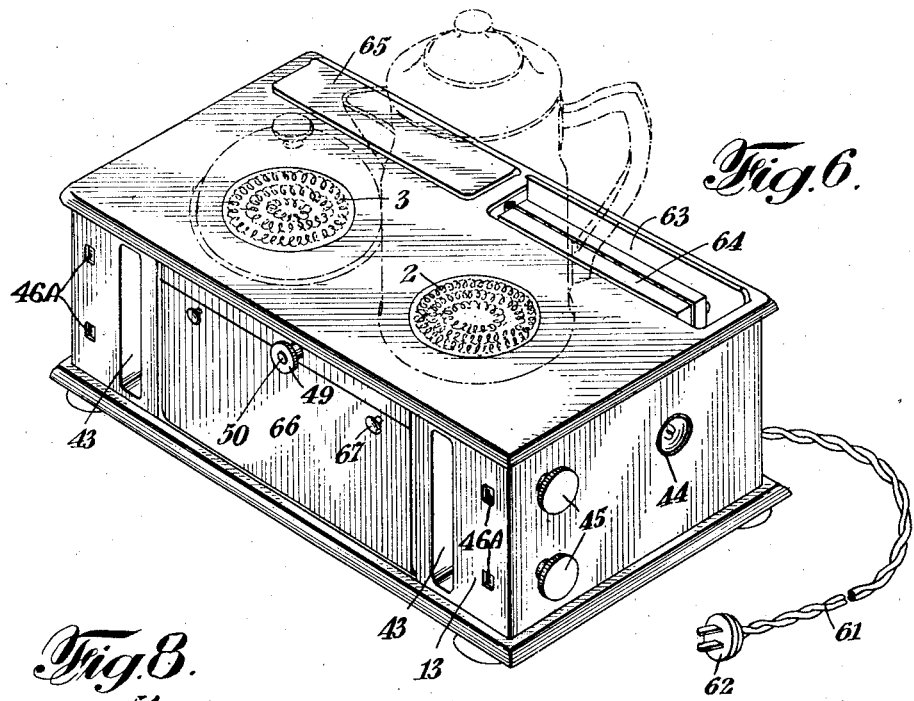
Fig. 6 is an elevation of a form of an electric heating unit having an oven in addition to the toaster and hot plates, and using a somewhat different form of timing mechanism.

Only such mechanism is shown as is necessary to illustrate the invention and the manner of its use for the construction of the particular heating units which will be described.

The heating unit illustrated in Figs. 1-5 of the drawings comprises three resistance elements 1, 2 and 3. For purposes of explaining the operation of the device it will be assumed that resistance element 1 is the element which cooks the toast, and may comprise the upper and lower resistances 1 which are shown on Fig. 2 of the drawings. The resistance element 2 may conveniently be contained within the hot plate 2 (Fig. 1) and the resistance element 3 may be within the hot plate 3 (Fig. 1). Referring to Fig. 3, the circuit within the heating unit includes the line circuit denoted generally by wires 4 and 5, and the element circuits denoted by the numerals 6, 7 and 8. Switches 9, 10 and 11 have two positions, in one of which they close the element circuits to their respective resistance elements and in the other of which they close the line circuit to the next succeeding element. When the switches 9, 10 and 11 are in the full line positions shown in Fig. 3, they are completing the line circuit, and when they are in the dotted line positions they are completing the element circuits.

The timing mechanism shown in Fig. 4, moves the switches 9, 10 and 11 into either the full line or dotted line positions. When the switches are all in the full line positions, no resistance element is energized. To operate all of the resistance elements of the cooker, the switches 9, 10 and 11 are all moved into their dotted line positions, whereupon resistance element 1 is energized, the circuit being through line wire 4, switch 9 (in dotted line position), resistance element 1 and line wire 5. After a predetermined time for which the timing mechanism is set, the timing mechanism throws the switch 9 from the dotted line position to the full line position. This disconnects resistance element 1 from the circuit and permits the current to flow through resistance element 2, the circuit being through line wire 4, switch 9 (in the full line position), switch 7 (in the dotted line position), resistance element 2, and line wire 5. After a predetermined length of time, the timing mechanism operates to throw the switch 10 from the dotted line position to the full line position, which breaks the element circuit to resistance element 2 and completes the circuit to resistance element 3, the circuit then being through line wire 4, switches 9 and 10 (in their full line position), switch 11 (in its dotted line position), resistance element 3, and line wire 5. After a further predetermined length of time the timing mechanism throws the switch 11 from its dotted line position to its full line position, which breaks the element circuit to resistance element 3. Although only three resistance elements are shown, it is obvious that an electric heating unit may be made with any number of resistance elements, it being merely a question of adding additional units of switches and timing mechanisms on to the circuit diagram shown in Fig. 3.

In the form of the electric heating unit shown in Fig. 1, the timing mechanism is composed of a plurality of individual timing devices which are interconnected so that when one timing device is operated to disconnect its resistance element from the circuit, it completes the line circuit to the succeeding resistance element and also starts the succeeding timing device. Any suitable timing device may be used but the form of timing device selected for description may conveniently consist of an operating handle 12, the forward end of which projects through the front 13 of the electric heating unit to provide a key 14. The handle is pivoted at 15 on some convenient portion 16 of the heating unit which may conveniently be a thin metal strip extending from the top to the bottom of the heating unit. A switch arm 17 is pivoted at 18 to a portion of the heating unit 19 which may also conveniently be a strip extending from the top to the bottom of the unit. The switch arm 17 and the operating handle 12 are connected by the connecting link 20 which is pivoted at 21 to the switch arm 17 and which is connected by means of the spring 22 to the pin 23 of the operating handle 12. Thus, when the operating handle 12 is moved from its full line position (Fig. 5) into its dotted line position, the switch arm 17 will be moved from the full line position to the dotted line position. As soon as, but not until, the operating handle 12 and the connecting arm 20 move downwardly past the pivot-point 18, the switch arm 17 will suddenly be thrown from its full line position to its dotted line position. Similarly, when the operating handle 12 and the connecting arm 20 move upwardly from the dotted line position to the full line position, the switch arm 17 will remain in the dotted line position until the operating handle 12 and the connecting arm 20 move upwardly past the pivot 18, which is preferably located, as shown, quite near the upper position of the operating arm 12. The blade 24 on the end of the switch arm 17 bridges the contacts 25 when it is in the full line position, to complete the line circuit, and bridges the contacts 26 when it is in the dotted line position to complete the element circuit. When the operating handle is in its full line position it may be said to be in its zero or off position, that is the position in which the element circuit is broken; and when the operating handle is in any position between the full line position and the dotted line position, and below the pivot 18, it may be said to be in its time-indicating position. Marks 27 on the front of the heating unit serve to indicate the time for which the timing devices may be set.

The operating handle 12 is returned from its time-indicating position to its zero position and the rate of the return movement is controlled by any suitable spring and escapement mechanism. As is shown on the drawings, the operating arm 12 is fast to a ratchet wheel 28, the teeth of which are engaged by a pawl 29 which is pressed against the teeth by the spring 30. Both the pawl 29 and the spring 30 are fastened to the outside of a casing 31 which contains a main spring (not shown) of sufficient strength to raise the operating handle 12 from its dotted line position to its full line position. The teeth 32, which may either be on the spring casing 31 or on the gear which is fastened to the spring casing, engage the small gear 33 which is connected to and revolves the scape wheel 34. The teeth of the scape wheel engage the pallets 35 of the familiar type of escapement, which includes the balance wheel 36. Thus the timing device may easily be wound merely by pressing down on the operating handle 12 which winds the main spring in the spring casing 31 which will return the operating handle to its zero position at a rate of speed depending upon the escapement, and the time which is taken to return the operating handle from any time indicating position to the zero position will depend upon the distance which the operating handle is moved downwardly from the zero position. The marks 27 on the front of the heating unit may be used to indicate the number of minutes which the operating handle will take to return from any marked position to the zero position.

In the form of timing mechanism shown in Fig. 4, the several timing devices are interconnected so that the timing device of switch 9 may be set for any number of minutes, say three minutes, and the timing device corresponding to switch 10 may be set for any time, say seven minutes, but the timing device of switch 10 will be held in its time-indicating position until the timing device of switch 9 has returned to zero position, whereupon the timing device of switch 10 will be started. For this purpose each succeeding timing device, that is the timing devices which are connected to switches 10 and 11, are provided with a ratchet wheel 37 which is also fast to the operating handle 12 or the spring casing 31. A pawl 38 is pressed by the spring 39 toward the teeth of the ratchet wheel 37. The pawl 38 is provided with a tail 40 of such a length that it can be engaged by an arm 41 of a preceding timing device. The arm 41 is operated by any part of a preceding timing device in such a manner that when the operating arm 12 of said preceding timing device has assumed its zero position, the arm 41 will engage the tail 40 of the pawl to disengage the pawl 38 from the teeth on the ratchet wheel 37 to start the timing device with which the pawl is associated. This may conveniently be done by fastening the arm 41 to the switch arm 17 so that when the switch arm of one timing device snaps from its dotted line position to its full line position, the arm 41 will hit the tail 40 of the pawl of the succeeding timing device to disengage the pawl from the ratchet wheel 37 of said succeeding timing device which permits the timing device to begin its movement under the influence of the spring within the casing 31 to raise its operating arm 12. As is shown in the drawings, it is unnecessary for the first timing device to have the ratchet wheel 37 and the pawl 38, but it should have the arm 41; similarly, it is unnecessary for the last timing device to have the arm 41. The intermediate timing devices are equipped with both the ratchet wheel 37, pawl 38 and arm 41. This form of timing mechanism is a unitary construction which may be used in other stoves, or for other purposes, if desired, or as a separate timing unit.

The use and operation of the heating unit shown in Fig. 1 can now readily be followed. The bread 42 for toasting is put in the toasting compartment 43. Two toasting compartments are shown on Fig. 1 of the drawings, it being understood that the heating elements of both toasting compartments are so arranged that all of the resistance elements in the toasting compartments are considered as a single resistance element 1 to be energized or deenergized by the single switch 9. Coffee and eggs may be placed on the two hot plates 2 and 3. The person who is using the stove merely presses the first key 14 to a position which may indicate three minutes, the second key to a position which indicates ten minutes, and the third key to a position which indicates four minutes. The second and third keys will remain in their depressed, or time indicating positions, and the hot plates will not heat. The resistance element for the toaster will be energized as soon as the first key is depressed. The first key will immediately begin to rise, and three minutes will be taken for it to reach its zero position. When the first operating arm 12 of the first key 14 slightly passes the pivot 18, which will happen when the key 14 is practically in its zero position, the first switch arm 17 will snap from its dotted line position to its full line position. The blade 24 of the switch 9 will then leave the contacts 26 breaking the circuit to the heating element 1, and will engage the line contacts 25 completing the line circuit to the resistance element 2. When the first switch arm snaps from its dotted line position to its full line position, the pawl engaging arm 41 of the first timing device will hit the tail 40 of the pawl on the succeeding timing device to disengage the pawl 38 from the teeth of the ratchet wheel 37. This will start the second timing device. The blade 24 of the switch 10 will be held in position to hold the circuit to the resistance element 2 closed for ten minutes, during which the resistance element 2 of the hot plate will be energized. At the end of ten minutes the second timing device will break the circuit to resistance element 2 and will complete the line circuit to resistance element 3, which is under the second hot plate, and at the same time the arm 41 of the second timing device will hit the tail 40 of the pawl 38 of the third timing device to start the operation of the third timing device. After four minutes the third timing device will operate to break the circuit to the resistance element 3 and the switch 11 will bridge the contacts 25 to complete the line circuit to any succeeding timing devices (not shown) which may be used if a stove having more than three heating units is desired. It may be desirable to have the last switch complete the line circuit to a socket 44 in which may be placed a light to indicate to the person who uses the stove that the several operations are complete and that the meal is cooked. Any additional apparatus, such as an extra oven, may also be connected into this socket, if desired, and will be energized at all times when the stove is connected to the house circuit, except when the timing mechanism is in operation.

The heating unit shown on Fig. 6 is substantially the same as that shown on Fig. 1, except that the time indicating devices are not interconnected and a fourth resistance element is used to heat an oven. In the form of stove shown on Fig. 6, the operating handles are in the form of knobs 45 instead of the keys 14. Each knob 45 may be connected to the ratchet wheel 28 and the associated mechanism shown on Fig. 5. In the larger form of apparatus shown on Fig. 6, the knobs 45 are also preferably associated with dials which show time markings 46-A through suitable openings in the front 13 of the stove in much the same way that dials show through openings on the familiar radio receiving sets. In the case where the several timing devices are not interconnected, it is necessary to use an additive system for setting the timing devices. Thus, if it is desired to heat the toast for three minutes, the coffee for ten minutes and the eggs for four minutes, the first timing device will be set for three minutes, the second timing device will be set for thirteen minutes, and the third timing device will be set for seventeen minutes. The timing devices will all operate at the same time but the first timing device will operate the switch 9 to break the circuit to resistance element 1 after three minutes, and at the same time will complete the line circuit to resistance element 2; the second timing device, which will be set for thirteen minutes, will operate for the remainder of the thirteen minutes and will energize the first hot plate for ten minutes, after which time it will throw the switch 10 from the dotted line position to the full line position to break the circuit to the resistance element 2 and complete the line circuit to the resistance element 3; the third timing device will operate for four minutes, that is the remaining part of the seventeen minutes for which it was set, after which it will operate to break the circuit to resistance element 3 and complete the line circuit to the fourth switch 46 in the element circuit of the fourth resistance element. The fourth timing device will of course have to be set for a number of minutes which is greater than seventeen minutes, and it will hold the switch 46 in position to energize the fourth resistance element for the number of minutes which correspond to the difference between seventeen and the number of minutes for which it is set.

Figure 8:
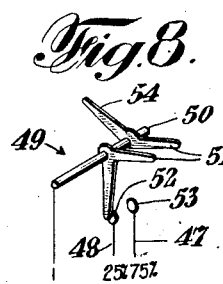
Fig. 8 is a diagrammatic illustration of the auxiliary oven switch used on the heating unit shown in Fig. 6.
Figure 7:
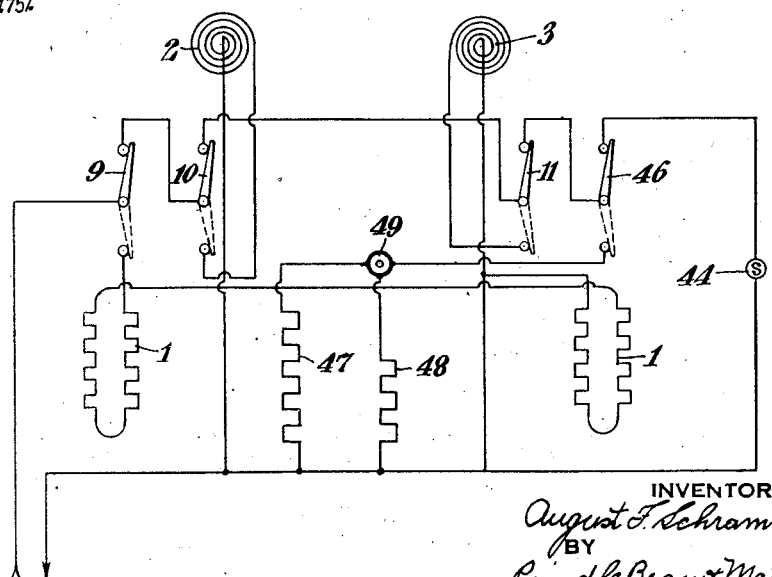
Fig. 7 is a diagram of the circuit used in the heating unit shown in Fig. 6.

As shown on Fig. 6, the fourth switch 46 controls the resistance element in the oven but it will be understood that any switch may be connected to any of the several resistance elements. It has been thought desirable to have the two resistance elements 47 and 48 in the oven so that the oven may be given different amounts of heat. A switch 49 in series with the fourth timed switch 46 enables either or both of the resistance elements 47 and 48 to be connected into the circuit. As is diagrammatically illustrated on Fig. 7, the resistance element 47 is intended to give 75% of full heat and resistance element 48 is intended to give 25% of full heat. By the arrangement of contacts shown in Fig. 8, either of the elements 47 and 48 may be thrown into the circuit in series with the timed switch 46. With the parts of the switch 49 in the position shown in Fig. 8, only the resistance element 48, which is intended to give 25% of the full heat, is in the circuit. By rotating the shaft 50 of the switch 49, the arms 51 may be made to contact with both of the contacts 52 and 53 of the resistance elements 47 and 48, to throw both of the elements into the circuit in parallel to give the full oven heat. By further rotating the shaft 50 so that the contact 54 makes contact with the pole 53, the resistance element 47 may be energized by itself to give 75% of full oven heat.

The various mechanisms heretofore described may be housed within any suitable casing 55, as is shown on the drawings. Suitable legs 56 support the stove above the table and the bottom of the stove is preferably, although not necessarily, of heat insulating material 57 so that the stove may be used on a table without danger of scorching the article on which it is set. The toast 42 may be supported on suitably placed wires 58. The resistance elements for the toasting compartment should be strung between suitable insulators 59. The top 60 of the stove may be of any suitable refractory material, for instance, a tough glass, such as pyrex, and the hot plates may be totally enclosed and set into the top of the stove, as is shown on Fig. 2, or they may be open and built into the stove, as is shown on Fig. 6. The stove is connected to the house lighting circuit by the usual cord 61 and plug 62.

Each stove is preferably provided in some suitable place (usually at the rear) with a compartment 63 in which certain cooking utensils, such as a waffle iron or pan 64, may be stored when not in use. A cover 65 is preferably provided for each of the compartments. In the larger form of stove shown in Fig. 6, the oven is provided with a door 66 which may be raised or lowered into position by the knobs 67. In this form of the stove certain of the cooking utensils may be stored in the oven when not in use.

In the form of heating unit shown in Figs. 9–12, the resistance elements 1 which cook the toast are at the sides of the unit and the two timing devices denoted generally at 68 and 69 are within the unit next to the toasting compartments. The toasting compartments may conveniently be made with outer shells 70 which are hinged at 71 to the base of the heating unit so that the toast may easily and quickly be inserted into or removed from the toasting compartments. The keys 14 which control the timing devices project from appropriate slots in the front of the unit. The timing device 68 may control the switch 9 which is connected to the heating elements 1 of the toasting compartments and the timing device 69 may control the switch 10 which is connected to the heating elements 2 of the hot plate.

The form of steamer shown in this particular modification of the heating unit includes a trough 72 in the base of an oven and electrodes 73 which project through the bottom of the oven into the bottom of the trough with a water-tight seal. For purposes of illustrating the invention the drawings show eggs as the article of food being cooked. To generate steam to cook the food a given amount of water 74 is placed in the trough so that it contacts with both of the electrodes 73. After the switches 9 and 10 have operated to disconnect the resistance elements 1 and 2, the circuit of the electrodes 73 is completed. The electric current will pass through the water between the electrodes 73, thereby heating the water sufficiently to turn it into steam which cooks the eggs 75 or other articles of food. When all of the water has been vaporized, the circuit between the electrodes 73 is automatically interrupted. The food to be cooked rests on the rack 76 which may be especially designed to hold eggs. The form of rack illustrated may conveniently be made of a single strand of wire which begins at the point 77. The wire then runs backwardly a certain distance toward the rear of the oven and then forms the parts 78 and 79 of the loops which hold the first two eggs. The wire then again runs rearwardly at 80 and then crosses the oven to form the parts 81 and 82 of the loops which hold the next eggs. The wire is bent back and forth on itself, as is shown on Figs. 10 and 11 of the drawings, to form the completed rack which fits into the oven. At the rear of the rack the wire runs along the back of the oven at 83 and is bent downwardly at 84 to form the supporting legs or feet. The wire finally ends at point 85. The two ends of the wire may conveniently be caught under brackets 86 on the door 87 so that when the door is pulled out the rack comes with it, but the door and rack may be separate if desired. The sides and rear of the oven are preferably provided with a beading 88 on which the sides and rear of the rack 76 may be supported.

The door 87 of the oven preferably has an inwardly tapered flange 89 which engages a corresponding inwardly tapered flange 90 on the front wall of the oven so that a relatively tight seal is obtained to prevent the escape of steam but if the steam pressure within the oven becomes too great, the door may easily move outwardly in order to relieve the pressure. The front of the door 87 is also preferably provided with additional flanges 91 which engage the front face 92 of the heating unit to prevent the door from being forced too far inwardly, that is to prevent the flanges 89 and 90 from being forced together so tightly that the door could not easily move outwardly if the steam pressure within the oven should become too great. These flanges 91 also serve to prevent the escape of steam. It will be noted that the preferred form of rack places the eggs in rows on either side of the trough 72 so that the points of the eggs are not directly above the trough. Also, the bottom of the oven is flat at the sides 93. The bottom of the oven is made in this way and the eggs are placed as just described, so that if an egg should happen to break during the time when it is being cooked, the liquid part of the egg will drop from the point of the shell on to the flat parts 93 of the bottom of the oven and will not run down into the trough 72 where it might interfere with the passage of the current through the water and between the electrodes 73. Other forms of racks and doors may, however, be used if desired.

This form of oven which is especially adapted to steam food or cook eggs, without the toasting compartment or the hot plate, may be built up on top of the heating unit shown in either Fig. 1 or Fig. 6, and may be substituted for one of the hot plates shown on either one of these units. Furthermore, this particular form of steaming or egg cooking oven may be substituted for the oven of the heating unit which is shown in Fig. 6. If the particular steaming oven is constructed by itself, the wires which lead to it may be plugged into the socket 44 on either of the heating units shown in Figs. 1 and 6. Although the diagram of the circuit which is shown in Fig. 12 discloses no timing device adapted to disconnect the circuit of the electrodes 73, such a timing device may easily be inserted in the circuit if so desired.

The timing devices which are used in the form of heating unit shown in Figs. 9–12 are the same as those shown in Fig. 4 but they are not interconnected because, according to the design of the heating unit, they do not lie next to each other. Any of the various timing devices may be used, however, and may be placed in different parts of the various heating units and may be used singly or may be inter-connected, depending upon their positions.

From the above description it will be seen that the invention may take many different forms and, although certain particular and preferred forms of the invention have been described, it is recognized that various other modifications may be made. It is, therefore, desired that the invention be construed as broadly as the claims, taken in conjunction with the prior art, may allow.

I claim:

1. The combination of a plurality of resistance elements, a switch mechanism having a plurality of positions which in one position connects a resistance element across the line and breaks the circuit to the succeeding element and in another position breaks the circuit to said first resistance element and completes the line circuit to the succeeding element, and a timing mechanism adapted to operate the switch mechanism after a predetermined interval of time.

2. The combination of a plurality of resistance elements, a switch mechanism for each element having two positions which in one position connects a resistance element across the line and breaks the line circuit to the succeeding elements and in another position breaks the circuit to said first resistance element and completes the line circuit to the next element and timing mechanism adapted to operate each switch mechanism after predetermined intervals of time.

3. The combination of an intermediate resistance element and end resistance elements, a line switch mechanism and an element switch mechanism in the circuit of the intermediate element, individually adjustable timing mechanisms to close the line switch to the intermediate element and after a predetermined time to open the element switch of the intermediate element and to close the line switch for the last end element, and an individually adjustable timing mechanism adapted to open the said last mentioned switch after a predetermined time.

4. The combination of an intermediate resistance element and end resistance elements, a line switch mechanism and an element switch mechanism in the circuit of the intermediate element, individually adjustable timing mechanisms to disconnect the first end element and simultaneously to close the line switch to the intermediate element and after a predetermined time to open the element switch of the intermediate element and to close the line switch for the last end element, and an individually adjustable timing mechanism switch to open said last mentioned switch after a predetermined time.

5. The combination of a plurality of resistance elements, a line circuit, an element circuit for each element, an individually adjustable timing device for each element, each timing device except the last one being adapted to cut its element out of the circuit and complete the line circuit to the succeeding element after a predetermined interval of time.

6. The combination of a plurality of resistance elements, a switch mechanism for each element except the last one, said switch mechanism having a plurality of positions in one of which positions it connects its resistance element across the line and breaks the line circuit to a succeeding element and in another of which positions it breaks the circuit to its resistance element and completes the line circuit to a succeeding element, and a timing device for each element to operate the corresponding switch mechanism after a predetermined interval of time.

7. The combination of a plurality of resistance elements, a timing device for each element except the last one, each timing device being adapted to cut its element out of the circuit and complete the line circuit to the succeeding element after a predetermined interval of time, and means whereby each timing mechanism initiates the operation of the next timing mechanism at the end of its period of operation.

8. The combination of a plurality of resistance elements, a timing device for each element except the last one, each timing device being adapted to cut its element out of the circuit and complete the line circuit to the succeeding element after a predetermined interval of time, and each timing mechanism being adapted, to initiate the operation of the next timing mechanism at the end of its period of operation.

9. The combination of a plurality of resistance elements, a timing device and a line switch for each element except the last one, each timing device being adapted to initiate the operation of the succeeding timing device when the preceding line switch connects the element of the said succeeding timing device into the circuit.

10. The combination of a plurality of resistance elements, a timing device for each element except the last one adapted to be set to disconnect its element from the line and to complete the line circuit to the succeeding element after a predetermined interval of time, a catch on a succeeding timing device adapted to hold its timing device in the position in which it is set, a catch releasing member operable from a preceding timing device to release the catch to start the said succeeding timing device when the preceding timing device operates to complete the line circuit to the succeeding element.

11. The combination of a plurality of resistance elements, a line circuit, an element circuit for each element, a switch for each element except the last one adapted to break the circuit to its element and complete the line circuit to the next element, a timing device for each switch adapted to be set to operate its switch after a predetermined interval of time, a catch on a succeeding timing device adapted to hold its timing device in the position in which it is set, a catch releasing member operable from a preceding timing device to release the catch to start the said succeeding timing device when the preceding timing device has thrown its switch to complete the line circuit to the succeeding timing device.

12. The combination of a plurality of resistance elements, a line circuit, an element circuit for each element except the last one, a switch for each element adapted to break the circuit to its element and complete the line circuit to the next element, a timing device for each switch, each of which timing devices includes a handle adapted to be set for a predetermined time by moving it from a zero position to a time indicating position, means for returning the handle to the zero position, and an escapement to regulate the speed at which the handle returns to the zero position, said switch being operated by the handle to complete the element circuit when the handle is in a time indicating position and when the handle is in the zero position to break the element circuit and complete the line circuit to a succeeding element.

13. The combination of a plurality of heating elements with individually adjustable time controls for each except the last one, arranged so that no more than one element is in circuit at one time, and so that when the time control of one puts it out of circuit, it begins the timing period of the next element.

14. The combination of a plurality of devices for conducting separate heating operations, a plurality of heating elements for separately heating each of said devices, individually adjustable time controls for each of said heating elements except the last one, arranged so that no more than one of said heating elements is in circuit at one time, and means whereby when the time control of one element puts it out of circuit, it begins the timing period of the next element.

15. The combination of a plurality of heating elements, a plurality of heat utilizing devices which are adapted for the separate heat utilizing elements and which are adapted for separate heat utilizing operations, said heating elements each except the last one having an individually adjustable time control, arranged so that only one heating element is in circuit at one time and that when the time control of one of such heating elements puts it out of circuit the timing period of the next heating element is begun.

16. The combination of separate means for utilizing heat, separate heating elements for each of said means, each of said heating elements except the last one being provided with individually adjustable time controls, means whereby when the time control of one element puts it out of circuit the timing period of the next element is begun, a signal, and means for actuating the latter when the last operation is completed.

17. The combination of a plurality of resistance elements, a switch mechanism for each element having two positions, which in one position connects its resistance element across the line and breaks the line circuit to the succeeding elements and in the other position breaks the circuit to its resistance element and completes the line circuit to the next element, and individually adjustable timing mechanisms adapted to operate each switch mechanism after predetermined intervals of time.

18. The combination of a plurality of resistance elements, a timing device for each element, each timing device being adapted to cut its element out of the circuit and complete the line circuit to the succeeding element after a predetermined interval of time, and each timing mechanism being adapted to initiate the operation of the next timing mechanism at the end of its period of operation.

19. The combination of an intermediate resistance element, and end resistance elements, a line switch mechanism and an element switch mechanism in the circuit of the intermediate element, an individually adjustable timing mechanism to close the line switch to the intermediate element and after a predetermined time to open the element switch of the intermediate element, and to close the line switch for the last end element.

20. The combination of an intermediate resistance element, and end resistance elements, a line switch mechanism and an element switch mechanism in the circuit of the intermediate element, and individually adjustable timing mechanism to disconnect the first end element and simultaneously to close the line switch to the intermediate element and after a predetermined time to open the element switch of the intermediate element and to close the line switch for the last end element.

AUGUST F. SCHRAMM, Jr.